Dec. 23, 1958  W. F. CLEMENT ET AL  2,865,627
FLUID-TYPE SPRING
Filed June 10, 1955
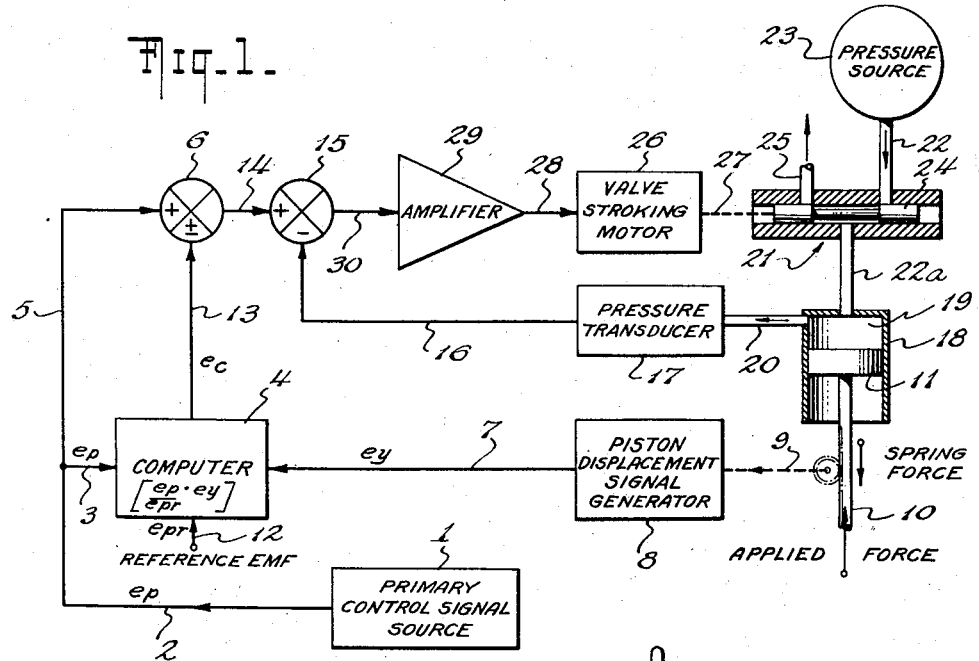
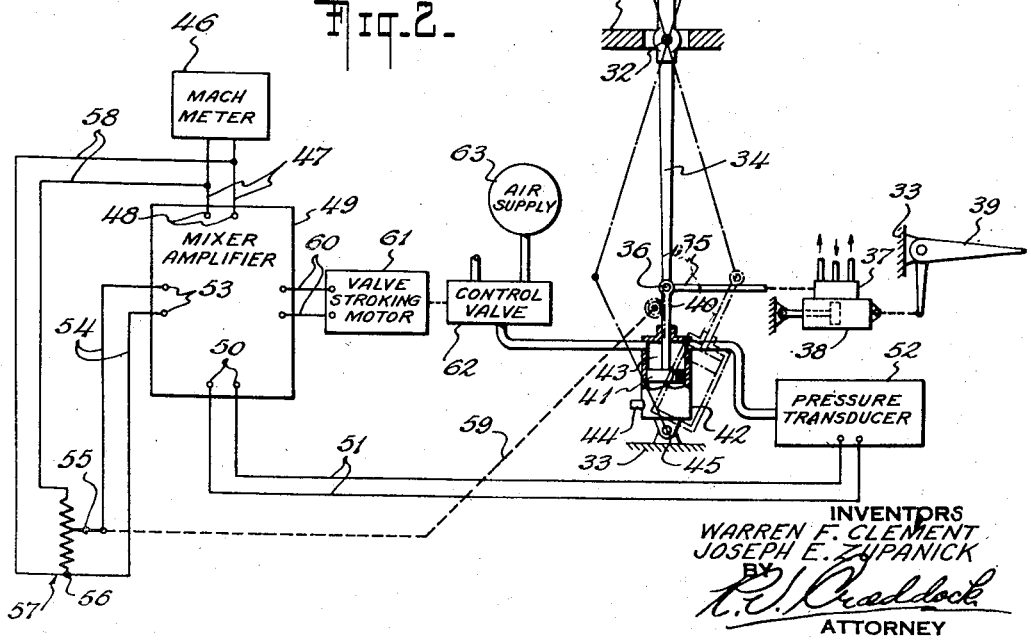
INVENTORS
WARREN F. CLEMENT
JOSEPH E. ZUPANICK
BY
R. J. Craddock
ATTORNEY United States Patent Office 2,865,627
Patented Dec. 23, 1958

2,865,627

FLUID-TYPE SPRING

Warren F. Clement, Plandome Manor, and Joseph E. Zupanick, Garden City, N. Y., assignors to Sperry Rand Corporation, a corporation of Delaware Application June 10, 1955, Serial No. 514,432

9 Claims. (Cl. 267—1)

This invention relates to improvements in spring systems that derive their spring forces from the pressure re-action of a fluid substance to the displacements of a displaceable element. More particularly, it concerns a novel system of this nature wherein the magnitude of the force-displacement gradient of the spring system is electrically adjustable.

The present system includes a hollow cylinder having a slideable piston fitted therein to define a pressure chamber in the cylinder on one side of the piston. The system further includes a pressure control arrangement for regulating the pressure of a fluid substance in the pressure chamber thus defined, hence for controlling a pressure-derived force on the piston which will oppose an externally-applied force on the piston when the latter force urges the piston to slide in the cylinder in a direction to decrease the pressure chamber's volume. The control arrangement comprises a feedback servomechanism for actuating a valve interposed in a connection between the cylinder's pressure chamber and a source of pressure fluid (liquid or gas) to control the chamber pressure in such a manner that chamber-volume-decreasing displacements of the piston caused by externally-applied forces result in controlled spring-like reaction forces on the piston.

The gradient of the reaction force relative to piston displacement (slope of force v. displacement plot) is governed by one or more primary or gradient control signals fed as inputs to the control arrangement together with a degeneratively or negatively fed-back chamber pressure signal. With pressure feedback, the spring-like reaction, itself, stems from the further feedback of a piston position signal. When the piston position signal is fed back in regenerative or positive fashion, the reaction opposes the piston displacement, thereby to impart a positive spring characteristic to the system. But when the piston position signal is fed back in degenerative fashion, the reaction assists the piston displacement, thereby to impart a negative spring characteristic to the system. In either case, the piston position feedback signal is fed back via a circuit arrangement by which an automatic adjustment of the position signal's sensitivity is obtained in accordance with changes in the magnitude of the primary control signal or signals.

The externally-applied force for displacing the piston in its volume-decreasing direction may be supplied through a positionable element, for example, to which it is desired to transfer the spring-like reaction force experienced by the piston in response to such displacement. And the primary control signal source may be such as to provide signal information that varies according to variations in a given condition or conditions, according to which it is desired to vary the force-displacement gradient or stiffness of the spring system.

Thus, the system is readily applied to feel-producing apparatus for manually-operated aircraft controls that actuate power devices for positioning control surfaces such as elevators, rudders, ailerons, elevons, and the like. Such of the power devices that are contemplated are those that normally are incapable of reflecting to the aircraft controls and the operator-pilot any feeling of the aerodynamic forces experienced by the control surfaces during flight. Therefore, when applied to aircraft feel-producing apparatus, the present system has its piston mechanically linked to the aircraft's control column, for example, and its primary control signal information is obtained from one or more devices that provide signals which are satisfactory measures of tactility for the operator-pilot, such as airspeed, mach number, dynamic pressure, altitude, acceleration, sideslip angle, and roll velocity. Therefore, as used throughout the description to follow, and in the claims, primary control signal shall refer to the signal output of one or more devices which produce an output signal in response to any of the above-named factors. Preferably, also, the feedback of piston position is employed in a regenerative sense to provide a positive spring characteristic to the system.

It is to be understood, however, that the pressure chamber in the present system need not be formed specifically by a piston slidably-disposed in a cylinder, as described. That is to say, the pressure chamber may be defined, generally, by a hollow structure formed in part by a movable portion, the movement of which serves to vary the chamber volume. Thus, the pressure control arrangement may function to introduce and pressure regulate a fluid substance in a bellows having a movable end-wall acted upon by the pressure of the fluid to react in a spring-like manner to externally-applied forces on said end-wall.

A principal object of the present invention is to provide precise regulation of fluid pressure in a pressure chamber defined by a hollow structure formed in part by a movable portion so that a given chamber-volume-decreasing displacement imparted to the movable portion results in a spring-like reaction force on the portion of predetermined magnitude and sense.

Another object is the provision of an improved cylinder-piston spring system wherein a pressure-supplied force on the piston is caused to vary as an adjustable function of piston displacement.

Another object is to provide the spring system as above wherein the adjustment of the force-displacement gradient is performed according to variations in one or more system input signals.

Another object is the provision of an improved fluid-type spring system that is readily transformed from a system having a positive spring characteristic to one having a negative spring characteristic, and vice-versa.

Another object is to provide an improved feel-producing apparatus for manually-operated aircraft controls that actuate power devices for positioning control surfaces yet feel no reflection of the aerodynamic forces experienced by said surfaces during flight.

Another object is the provision of a novel fluid-type spring system wherein a pressure chamber is formed in part by a movable surface to which externally-applied forces may be imparted, said externally applied forces being countered by spring-like reaction forces resulting from control of chamber pressure by a feedback servomechanism responsive to one or more primary control signals, a chamber pressure feedback signal, and a movable surface position feedback signal, the sensitivity of the latter feedback signal being automatically varied according to changes in the primary control signal level.

Other objects and advantages of the present invention will become apparent as the description proceeds, and by reference to the drawings, wherein:

Fig. 1 depicts a generalized spring system according to the present invention; and Fig. 2 illustrates the ssytem of Fig. 1 modified to form a feel-producing arrangement for aircraft controls.

In Fig. 1, a signal source 1 supplies a primary control signal $e_p$ via a source output lead 2 to one input lead 3 of a computer element 4 and to one input lead 5 of a signal combining element 6. Computer element 4 is provided with a second input lead 7 by which it receives the output $e_y$ of a signal generator 8 mechanically actuated through a connection 9 to the stem 10 of a piston 11. Generator 8 is such that signal $e_y$ varies in magnitude according to the displacement of piston 11 from a given axial position thereof, and may, for example, be of the potentiometer type having its wiper arm driven by connection 9. A third input lead 12 feeds a reference signal $e_{pr}$ to computer element 4. For purposes of discussion, primary control signal source 1 and piston displacement signal generator 8 will be considered as an electrical voltage source and an electrical signal generator, respectively, and computer 4 will be considered as an apparatus responsive to electrical voltages. As here used, the term "lead" refers to an electrical conductor capable of transmitting electrical energy. The term "signal" is used to refer to variations in the electrical voltage on a conductor, by means of which intelligence is conveyed.

It will be appreciated by those skilled in the art that the elements just described, as well as others to be described hereinafter, may also find counterparts in the hydraulic and pneumatic art, and this invention may be practiced by employing such devices. In such case the term "lead" will refer to a conduit capable of transmitting a fluid, and the term "signal" will refer to variations in the pressure of said fluid.

The three signal inputs to computer element 4 are operated upon by the computer to produce a computer output signal $e_c$ on a lead 13 proportional to the product $$\left(\frac{e_p \cdot e_y}{e_{pr}}\right)$$

Computer element 4 may, for example, be of the servo driven potentiometer type shown on page 57 of "Analog Methods in Computation and Simulation," McGraw-Hill, 1954. In the computer element shown on page 57 of the referenced book, the variable voltages $e_1$ and $e_2$ correspond to the voltages $e_p$ and $e_y$ of Fig. 1, and the reference voltage E corresponds to the reference voltage $e_{pr}$ of Fig. 1.

It is to be understood that other well known computers may be employed in the place of the above-referenced computer without departing from the scope of the invention. Such other computers may or may not require a reference voltage $e_{pr}$ as shown in Fig. 1. For example, the computer element illustrated in Fig. 2, and to be described later, employs no such reference voltage.

Lead 13 is connected to combining element 6 to form a second input lead therefor. Combining element 6 may, for example, be a simple parallel or series resistance network arranged in a well-known manner to algebraically add the signal inputs thereto. As a matter of choice, the signal combination produced by combining means 6 may be additive or subtractive, depending on the polarity relationship selected for the inputs; and the choice is made according to the spring characteristics desired, as will hereinafter become apparent. In either event, computer element 4 insures that the piston displacement signal $e_y$ is modified by the same multiple by which the primary control signal changes whenever the latter departs from the value of reference signal $e_{pr}$. Hence, the sensitivity of signal $e_c$ relative to $e_y$ is automatically adjusted for changes in the signal $e_p$.

The combination signal output of combining element 6 is then fed via a lead 14 to one input connection of a second signal combining element 15 like element 6, wherein the signal output of element 6 is subtractively combined with a signal fed to another input connection of combining element 15 via a lead 16 from a pressure transducer 17. Piston 11 is slideably disposed in a hollow cylinder 18 to define a pressure chamber 19 of variable volume in the cylinder on one side of the piston, the cylinder portion on the other side of the piston being open to atmospheric pressure or some other constant pressure environment. Pressure transducer 17 is operatively connected via a conduit 20 to pressure chamber 19, and supplies an electrical signal on lead 16 that varies in magnitude according to pressure variations in chamber 19. Pressure transducers of this nature are well known, and may, for example, comprise a bellows arranged to actuate an electrical pickoff.

A three-way valve 21 is connected to a conduit 22 from a source 23 of fluid substance under pressure and to a conduit 22a from chamber 19. Valve 21 is provided, for example, with a generally dumbbell shaped spindle 24 having a centered position (as depicted in Fig. 1) and is movable laterally to the left or right of said centered position. When stroked to the left of center, spindle 24 connects chamber 19 to an atmospheric exhaust conduit 25, while at the same time closing conduit 22 so that no pressure fluid enters chamber 19 from source 23. When stroked to the right of center, spindle 24 opens conduit 22 to admit pressure fluid from source 23 to chamber 19, while at the same time closing exhaust conduit 25. At center, spindle 24 closes both conduits 22, 25 so that chamber 19 is open to neither exhaust nor fluid source.

A valve-stroking motor 26 is linked by a mechanical connection 27 to valve spindle 24 for stroking the latter according to the energization that motor 26 receives via a lead 28 from an amplifier 29 having its input connected via a lead 30 to the output connection of subtractive combining element 15.

In the operation of the system, the primary control voltage $e_p$ from signal source 1 and the piston displacement voltage $e_y$ from signal generator 8 are combined in computer 4 to produce a resultant piston displacement voltage $e_c$. This voltage is algebraically combined with the primary control voltage $e_p$ in combining element 6, and via amplifier 29 and motor 26, the resultant combined voltage actuates control valve 21. Assuming that voltages $e_p$ and $e_c$ are additively combined in element 6, motor 26 will be energized by the resultant signal which is amplified in amplifier 29, and motor 26 will actuate valve 21 to introduce fluid into chamber 19 and cause a pressure to be built up in the chamber. Pressure transducer 17 will generate a voltage which is proportional to the pressure in the chamber, and this pressure voltage will be fed back and negatively combined in combining element 15 with the resultant voltage on lead 14. When the magnitude of the pressure chamber voltage equals the magnitude of the resultant voltage fed into combining element 15 on lead 14, there will be no electrical output from element 15 and spindle 24 will return to its center position and will maintain the pressure in chamber 19 at the value commanded by the resultant voltage. Thus, it is seen that a servomechanism loop for maintaining the pressure in chamber 19 proportional to the resultant voltage is formed by combining element 15, amplifier 29, valve-stroking motor 26, valve 21, pressure transducer 17, and lead 16. Therefore, with volume-decreasing displacement of piston 11, voltage $e_y$ will increase proportionately and will cause the resultant voltage on lead 14 to increase in like manner and actuate valve 21 to permit more fluid to enter chamber 19 from source 23, causing the pressure in chamber 23 to increase as piston 11 is thus displaced. Hence, the fluid pressure force exerted on piston 11 increases with piston displacement, resulting in a positive spring-like characteristic.

It is to be noted that in the absence of the piston displacement signal, the fluid pressure force exerted on piston 11 would be proportional only to the primary control source signal $e_p$, and if that signal were held at a fixed magnitude, the fluid pressure exerted on piston 11 will be constant for any piston displacement since the servomechanism means operates to maintain the pressure in chamber 19 proportional to the input of combining element 15.

As previously noted, combining element 6 may, as a matter of choice, be arranged to be additive or substractive depending on the spring characteristics desired, i. e., a positive spring or a negative spring, respectively. If element 6 adds or regeneratively combines signal $e_c$ with signal $e_p$, it will be apparent that the further that piston 11 is upwardly displaced by an externally-applied force, the larger will be the chamber pressure that is called for by the signal input on lead 14 to the pressure-regulating negative feedback servo loop. Conversely, if element 6 subtracts or degeneratively combines signal $e_c$ with signal $e_p$, it will be equally apparent that the upwardly increasing displacement of piston 11 will call for a continuously decreasing chamber pressure. Thus, by the regenerative or degenerative feedback in the present system of a piston displacement term, and since the chamber-exposed end-face of piston 11 is of constant surface area, the pressure-derived force reaction of the piston can be made to increase or decrease with piston displacement.

Because of the manner in which primary control signal $e_p$ and the piston displacement signal $e_y$ are combined in computer element 4, the force-displacement gradient, i. e., the slope of the force v. displacement curve is adjusted by primary control signal $e_p$. The higher the value of $e_p$, the stiffer the spring system becomes, and conversely. And it will be apparent that if $e_p$ varies according to a variable condition, then too will the gradient or stiffness of the spring system vary or adjust according to the condition. Signal $e_p$ may be a composite signal, i. e., a combination of a plurality of signals respectively proportional to a like plurality of external variables. Thus, the present spring system provides for stiffness control as a function of one or more variables simultaneously.

Signal generator 8 may provide a signal that varies linearly with piston displacement or non-linearly, as a matter of choice. If signal generator 8 is selected to provide a linear signal, the force-displacement gradient for a given value of $e_p$ will be linear, and conversely. In regard to the fluid substance supplied under pressure by source 23, it may be gas or liquid. Gas is well-suited to provide a wide range of spring gradients. However, for improved dynamic response and in cases where extremely high stiffness is required of an elastic restraint, it would be preferable to utilize a hydraulic arrangement. In either case, the principles of operation would be identical.

Referring now to the feel-producing system of Fig. 2 wherein the generalized spring system of Fig. 1 is modified for a specific application, a control column 31 is pivotally mounted at its base to a pivot 32 on a portion 33 of the framework of an aircraft. Column 31 has an extension 34 that extends somewhat below pivot 32. A horizontally-disposed rod 35, as viewed in Fig. 2, is pivotally connected at one of its ends to the lower end 36 of extension 34 and is connected at its other end to a control valve 37 for an hydraulic servomotor 38 of an irreversible or one-way force transmission type drivably connected to an aircraft control surface 39. By this arrangement, movement imparted by the pilot to control column 31 on one side of an upright neutral position therefore will move rod 35 to stroke valve 37 so as to cause servomotor 38 to position surface 39 a proportionate distance in a given direction. Column movement on the other side of neutral results in the positioning of surface 39 in the opposite direction.

In order to provide the pilot with feel on control column 31, there being no reflection through servo 38 to the column of aerodynamic forces on surface 39, extension 34 is also pivotally linked at its end 36 to the stem 40 of a piston 41 slidably disposed in a cylinder 42. Cylinder 42 and piston 41 correspond to cylinder 18 and piston 11, respectively, in Fig. 1. However, in cylinder 42 a pressure chamber 43 is formed on the stem side of piston 41 rather than on the side opposite, which side now is continually exposed to atmospheric pressure by way of an outlet 44. Further, cylinder 42 is externally equipped at its outlet end with a pivotal connection 45 to the airframe at a point directly below column pivot 32. By this arrangement chamber 43 has its greatest volume when column 31 is in its neutral position, and any departure of the column from neutral, regardless of direction, serves to draw piston 41 up in a volume-decreasing sense.

As in Fig. 1, the chamber pressure of the cylinder is closely regulated by servomechanism means responsive to one or more primary control signals and a pair of feedback signals that vary respectively according to chamber pressure and piston displacement. Accordingly, in Fig. 2, the source of primary control signal is depicted as a mach meter 46, although other devices such as those responsive to airspeed, dynamic pressure, altitude, sideslip angle, and acceleration may be employed singly or in combination to provide such signal. As used in the discussion of Fig. 2, the terms "signal" and "lead" have the same definitions as set forth in connection with the discussion of Fig. 1. Mach meter 46 provides an electrical output signal which varies according to variations in the mach number attained by the aircraft, and it is according to these variations that it is desired in the example of Fig. 2 to adjust the stiffness or gradient of the feel forces produced.

A pair of leads 47 feed the mach meter signal output to a first terminal pair 48 in the input circuit of a mixer-amplifier 49. A second input terminal pair 50 of mixer-amplifier 49 which is employed in lieu of and for the same purpose as the combining elements 6, 15 and amplifier 29 (Fig. 1) is connected via a pair of leads 51 to the output terminals of a pressure transducer 52 corresponding to transducer 17 (Fig. 1) and is similarly arranged to provide a degenerative or negative feedback signal that varies in magnitude according to pressure variations in chamber 43. A third input terminal pair 53 of the mixer-amplifier is connected via a pair of leads 54 to a movable wiper arm 55 and one end terminal 56 of a potentiometer 57 that is energized via a pair of leads 58 by the signal output of mach meter 46. By drivably connecting wiper arm 55 through a mechanical connection 59 to stem 40 of piston 41, a signal is fed to mixer-amplifier 49 on leads 54 that varies in magnitude according to departure of piston 41 from its lowermost position, as viewed in Fig. 2, and according to the magnitude of the output voltage of mach meter 46. It may be considered that the sensitivity of the piston displacement signal coupled to terminal pair 53 is automatically changed in proportion to the variations in the magnitude of the mach meter electrical output signal since the voltage across the ends of potentiometer 57 is the output voltage of mach meter 46. Thus, the potentiometer arrangement just described is the full equivalent of the combined signal generator 8 and computer 4 of Fig. 1. It will be noted that the embodiment of the invention shown in Fig. 2 does not require a separate reference voltage, such as $e_{pr}$ of Fig. 1, to obtain an electrical signal proportional to the displacement of piston 41 and to the magnitude of the electrical output signal of mach meter 46. Mixer amplifier 49 may be any one of a number of well-known forms, suitable ones of which are described in section 18–3 of vol. 19 of the Radiation Laboratory Series, McGraw-Hill, 1949.

Since in a feel-producing system for aircraft, the reactive force felt by the pilot on the control column should increase as he displaces the column from neutral, the piston displacement signal on leads 54 (Fig. 2) is fed to mixer-amplifier 49 in a regenerative feedback sense so as to produce a positive spring characteristic. Therefore, the electrical output signal from mach meter 46 and the piston displacement signal on leads 47 and 54, respectively, are coupled to mixer-amplifiers 49 with like polarities and are algebraically combined. The output of mixer-amplifier 49 is coupled via a pair of leads 60 to a valve-stroking motor 61 arranged to actuate control valve 62 in accordance with the electrical output signal of mixer-amplifier 49. The motor and valve arrangement is the same as provided by motor 26 and valve 21 of Fig. 1, except that in the present example the pressure source is preferably an air supply apparatus.

Pressure transducer 52 is an apparatus similar to the pressure transducer 17 of Fig. 1 and produces an electrical output signal which is proportional to the fluid pressure in chamber 43. Pressure transducer 52 may take the form of a bellows which by means of a mechanical linkage actuates the movable member of an electrical pick-off device such as a sliding contact of a potentiometer. The pressure transducer signal is fed via leads 51 to a mixer-amplifier 49 as a degenerative signal. This latter connection completes the servomechanism loop which maintains the fluid pressure in chamber 43 proportional to the combined mach meter and piston displacement signals.

When control column 31 is in the neutral position, the fluid pressure in chamber 43 will be proportional only to the electrical output signal of mach meter 46 and will vary in accordance with the mach number attained by the aircraft.

As control column 31 is displaced from its neutral position the piston displacement signal on leads 54 will increase in magnitude, causing the output of mixer-amplifier 49 to increase in like manner. This signal will energize motor 61 and will cause a corresponding increase in the fluid pressure in chamber 43 as a result of the action of the servomechanism means described above. Thus the reactive force on control column 31 will have a positive spring-like characteristic whose spring gradient is determined by the mach meter output.

The linearity or non-linearity of the force-displacement gradient for a given mach number may be governed by choice of potentiometer 57 in a manner comparable to the selection in Fig. 1 of signal generator 8, except that in Fig. 2 the relative arm lengths of piston-actuating linkage 34, 40 must be jointly considered with potentiometer 57 in the selection of the latter.

It will be noted that the pressure-derived spring force on piston 41 (Fig. 2) urges the piston downward at all times. Hence, if the pilot should release column 31 at a time when the column is displaced from neutral, the piston will be driven downward, thereby to restore column 31 to neutral. Thus, the feel-producing system of Fig. 2 not only produces feel forces simulating the aerodynamic forces on control surface 39 when column 31 is actuated, but also urges the column toward its neutral position upon release, as would occur if there were a direct connection between surface 39 and column 31.

It will further be noted that the pressure feedback signal on leads 51 (Fig. 2) is a measure of stick force, and therefore may be used simultaneously in flight control apparatus having need for such a signal, thereby eliminating the necessity in such cases for a separate stick force signal generator of the strain-gauge type or other force-responsive type.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A fluid-type spring comprising means defining a chamber having a portion of fixed surface area that may be displaced in position by externally-applied forces to vary the volume of said chamber, a source of fluid substance under pressure, controllable means in communication with said fluid source and said chamber for introducing and exhausting said fluid substance into and out of said chamber and regulating its pressure therein, means providing a primary control signal of variable magnitude, means providing a second signal proportional to the fluid pressure in said chamber, means for providing a third signal proportional both to said primary signal and to the displacement of said displaceable portion from a predetermined position thereof, means for combining said three signals to produce one resultant signal, said second signal being introduced into said combining means as a degenerative signal with respect to said primary signal, and means coupled to said combining means and responsive to said resultant signal for controlling said controllable means to regulate the fluid pressure in said chamber, whereby the fluid pressure exerted on said displaceable portion is proportional to said primary control signal and the displacement of said displaceable portion.

2. Apparatus for imparting to a movable surface a pressure-derived force of spring-like character in reaction to movement of said surface, wherein said surface defines part of a hollow structure the internal volume of which may be varied by said movement, said apparatus comprising a source of fluid substance under pressure connected to said hollow structure, signal-responsive means interposed in the connection between said source and structure for regulating the fluid pressure in said structure, a source of primary control signal, means for providing a signal proportional to displacements of said surface from a preselected position thereof relative to the remainder of said hollow structure, means for providing a signal proportional to the pressure of fluid in said hollow structure, means for adjusting the sensitivity of said surface displacement signal in accordance with departures of said primary signal from a predetermined magnitude thereof, and means for algebraically combining said primary control signal with said pressure signal and the adjusted version of said displacement signal and feeding the resultant signal to said signal-responsive means for varying the fluid pressure in said structure in accordance with the magnitude and sense of said resultant signal.

3. The apparatus claimed in claim 2, wherein the pressure signal is combined in a degenerative sense with respect to the primary signal, and the sense of variation of the pressure-derived force with respect to the movement sense of the surface depends upon the sense in which the displacement signal is combined with respect to said primary signal.

4. Apparatus for providing a regulated pressure-derived force on a movable element of fixed surface area wherein said element defines part of a hollow structure the internal volume of which may be varied by imparting movement to said movable element, said apparatus comprising a source of fluid substance under pressure, controllable means in communication with said source and said hollow structure for introducing and exhausting said fluid substance into and out of said structure and regulating its pressure therein, means providing a variable primary control signal, means providing a second signal proportional to the fluid pressure in said hollow structure, means providing a third signal proportional to the displacement of said movable element from a reference position, means for combining said three signals and deriving a fourth signal therefrom, said primary control signal and said second signal being combined so as to oppose one another, means responsive to said fourth signal controlling said controllable means, whereby a force is exerted by said fluid substance in said hollow structure upon said movable element, said force varying with the magnitude of said primary control signal and with the displacement of said movable element from a reference position.

5. Apparatus for imparting to a movable surface a pressure-derived force of spring-like character in reaction to movement of said surface, wherein said surface defines part of a hollow structure the internal volume of which may be varied by said movement, said apparatus comprising a source of fluid substance under pressure connected to said hollow structure, signal-responsive means interposed in the connection between said source and structure for regulating the fluid pressure in said structure, a source of primary control signal, means for providing a signal proportional to displacement of said surface from a preselected position relative to the remainder of said hollow structure, said last-named means providing adjustment of the sensitivity of said surface displacement signal in accordance with variations in the magnitude of said primary signal, means for providing a signal proportional to the pressure of the fluid in said hollow structure, and means for algebraically combining said primary control signal with said pressure signal and said displacement signal and feeding the signal resulting therefrom to said signal-responsive means for regulating the fluid pressure in said hollow structure.

6. A fluid-type spring device of adjustable stiffness comprising means defining a chamber having a portion of fixed surface area that may be displaced in position by externally applied forces to vary the volume of said chamber, means providing a primary control signal of variable magnitude according to the variations of which it is desired to adjust the stiffness of said spring device, a source of fluid substance under pressure, means connecting said fluid source to said chamber, said connecting means including valve means controllable to regulate the pressure of fluid in said chamber, means for providing a second signal proportional to the fluid pressure in said chamber, means for providing a third signal proportional both to the primary signal and to the displacement of said displaceable portion from a reference position, means for combining said second and third signals with said primary signal to produce a resultant signal, said second signal being introduced into said combining means as a degenerative signal with respect to said primary signal, and means coupled to said combining means and responsive to said resultant signal for controlling said valve means, whereby a displacement of said displaceable portion results in a change of said pressure-derived force of a magnitude dependent upon the magnitudes of said primary signal and said third signal, the sense of the change of said force being dependent upon whether said third signal is introduced into said combining means as a degenerative or as a regenerative signal with respect to said primary signal.

7. An apparatus for providing a fluid-derived force opposing a movable member wherein said force is proportional to the movement of said member and the force-displacement gradient of said apparatus is controllable, the combination with said movable member comprising a hollow structure the internal volume of which may be varied by the displacement of said movable member, a source of fluid substance under pressure, controllable means in communication with said source and said hollow structure for introducing and exhausting said fluid substance into and out of said structure and thereby regulating the pressure therein, a source of variable primary control signal according to the variation of which the force-displacement gradient of the apparatus is controlled, means for providing a second signal proportional to the displacement of said movable member and to said primary control signal, means for combining said two signals and deriving a resultant signal therefrom, servomechanism means responsive to said resultant signal including said controllable means and means responsive to the pressure of said fluid substance in said hollow structure for establishing a pressure in said hollow structure proportional to the magnitude of said resultant signal.

8. Apparatus for providing a spring-like force on a control member in response to displacements of said control member from a preselected neutral position, said apparatus comprising a hollow cylinder, a piston slideably disposed in said cylinder to form a pressure chamber in the cylinder on one side of said piston, force-transmission means drivably connecting said control member to said piston so as to slide the latter in a chamber-volume-decreasing sense whenever said control member is displaced from said preselected neutral position, a source of fluid substance under pressure, controllable means in communication with said source and said chamber for controlling the admission and escape of said fluid substance into and out of said chamber and thereby regulating the fluid pressure therein, a source of variable primary control voltage, means for providing a second voltage proportional to the displacement imparted to said piston in response to the movement of said control member, said second voltage also being proportional to the magnitude of said primary control voltage, means for additively combining said two voltages and deriving a resultant voltage therefrom, servomechanism means responsive to said resultant voltage and controlling said controllable means to establish a fluid pressure in said chamber proportional to said resultant voltage, said servomechanism means including means for providing a voltage proportional to the fluid pressure in said chamber, said last-named voltage comprising a degenerative feedback voltage in said servomechanism means.

9. An apparatus for providing a fluid-derived force opposing a movable member wherein said force is proportional to the movement of said member and the force-displacement gradient of said apparatus is controllable, the combination with said movable member comprising a hollow structure the internal volume of which may be varied by the displacement of said movable member, a source of fluid substance under pressure, controllable means in communication with said source and said hollow structure for introducing and exhausting said fluid substance into and out of said structure and thereby regulating the pressure therein, a source of variable primary control signal according to the variation of which the force-displacement gradient of the apparatus is controlled, means for providing a second signal proportional to the displacement of said movable member and to said primary control signal, means for combining said two signals and deriving a resultant signal therefrom, and servomechanism means connected to said controllable means and responsive to said resultant signal for establishing a pressure in said hollow structure proportional to the magnitude of said resultant signal.

References Cited in the file of this patent

UNITED STATES PATENTS

| | | |
|---|---|---|
| 1,087,305 | Lane | Feb. 17, 1914 |
| 1,371,648 | Schmidt | Mar. 15, 1921 |
| 2,523,198 | Davies | Sept. 19, 1950 |
| 2,538,618 | Fairchild | Jan. 16, 1951 |
| 2,601,867 | Alyea | July 1, 1952 |
| 2,724,565 | Trevaskis | Nov. 22, 1955 |